United States Patent
Starr et al.

(10) Patent No.: US 7,924,346 B2
(45) Date of Patent: Apr. 12, 2011

(54) APPARATUS AND METHOD FOR DISPLAY SCREEN FLICKER DETECTION AND CORRECTION

(75) Inventors: Johanas L. Starr, Cedar Rapids, IA (US); Mark C. Thompson, Center Point, IA (US); Brian J. Clair, Cedar Rapids, IA (US); Harold W. Tiedemann, Cedar Rapids, IA (US)

(73) Assignee: Intermec IP Corp., Everett, WA (US)

( * ) Notice: Subject to any disclaimer, the term of this patent is extended or adjusted under 35 U.S.C. 154(b) by 0 days.

(21) Appl. No.: 12/612,253

(22) Filed: Nov. 4, 2009

(65) Prior Publication Data

US 2010/0045859 A1  Feb. 25, 2010

Related U.S. Application Data

(62) Division of application No. 11/225,395, filed on Sep. 13, 2005, now Pat. No. 7,633,550.

(60) Provisional application No. 60/609,672, filed on Sep. 13, 2004.

(51) Int. Cl.
  *H04N 17/00* (2006.01)
  *H04N 17/02* (2006.01)
  *H04N 9/73* (2006.01)
(52) U.S. Cl. ........ 348/497; 348/180; 348/184; 348/189; 348/226.1
(58) Field of Classification Search .................. 348/180, 348/184, 189, 226.1, 497; 345/78
See application file for complete search history.

(56) References Cited

U.S. PATENT DOCUMENTS

| | | | | |
|---|---|---|---|---|
| 5,298,993 | A * | 3/1994 | Edgar et al. | 348/180 |
| 6,084,564 | A * | 7/2000 | Ohara et al. | 345/20 |
| 6,111,359 | A * | 8/2000 | Work et al. | 315/56 |
| 6,177,955 | B1 * | 1/2001 | Downen et al. | 348/189 |
| 6,313,873 | B1 * | 11/2001 | Lee | 348/177 |
| 6,593,921 | B2 * | 7/2003 | Nakanishi et al. | 345/208 |
| 6,700,627 | B2 * | 3/2004 | Yang et al. | 348/674 |
| 6,714,191 | B2 * | 3/2004 | Wu et al. | 345/204 |
| 7,023,470 | B2 * | 4/2006 | Braun | 348/180 |
| 7,057,667 | B1 * | 6/2006 | Mori et al. | 348/554 |
| 7,119,492 | B2 * | 10/2006 | Kuroda | 315/134 |
| 7,133,148 | B2 * | 11/2006 | Silverstein | 358/1.15 |
| 7,180,530 | B2 * | 2/2007 | Whittington et al. | 345/690 |
| 7,388,623 | B2 * | 6/2008 | Uehara | 348/790 |
| 2001/0004253 | A1 * | 6/2001 | Fukutoku et al. | 345/96 |
| 2002/0053999 | A1 * | 5/2002 | Chou | 345/58 |
| 2003/0011679 | A1 * | 1/2003 | Jung et al. | 348/181 |
| 2003/0052853 | A1 * | 3/2003 | Wu et al. | 345/90 |
| 2004/0145596 | A1 * | 7/2004 | Yamakawa et al. | 345/690 |

FOREIGN PATENT DOCUMENTS

WO  WO 96-37995  * 11/1996

* cited by examiner

*Primary Examiner* — Brian Yenke
(74) *Attorney, Agent, or Firm* — Shook, Hardy & Bacon LLP.

(57) ABSTRACT

An improved display screen flicker detection and correction system. The system includes a flicker detection component. A test pattern is placed on a display screen to be tested and corrected. The flicker detection component is placed on or near the display screen. The flicker detection component senses the change in light level that results from the flickering screen. The display system is then adjusted to minimize flicker.

10 Claims, 9 Drawing Sheets

APPARATUS AND METHOD FOR DISPLAY SCREEN FLICKER DETECTION AND CORRECTION

CROSS REFERENCE TO RELATED APPLICATIONS

This application is a divisional of U.S. application Ser. No. 11/225,395, filed Sep. 13, 2005, which claims the benefit of U.S. Provisional Application No. 60/609,672, filed Sep. 13, 2004. The entire specification of U.S. application Ser. No. 11/225,395 and U.S. Provisional Application No. 60/609,672, including all text and drawing figures are herein incorporated by reference.

BACKGROUND OF THE INVENTION

1. Field of the Invention

The present invention generally pertains to the detection and correction of flicker in display screens.

2. Description of Related Art

Display screens are used with many different types of devices. For example, many types of computerized devices employ a display screen as a user interface. A listing herein of all of the types of devices employing display screens would not be practical. Screens are currently commonly found in telephones (cellular, satellite, landline, etc.), handheld computerized devices (such as data collection and communication devices, personal digital assistants, electronic gaming devices, testing devices, handheld computers, etc.), and entertainment devices (televisions, video players, audio players), etc.

It has been found, however, that many such display screens, especially color screens, exhibit screen "flicker" unless they are properly adjusted. The flicker is often perceptible by the human eye and it is often distracting to the user of the device. Further, a flickering screen is often considered to be defective by the user.

Some manufacturers have attempted to address the flicker problem. Screens are sometimes adjusted during the manufacturing or inspection process by having an employee visually observe the flicker in a screen. The employee then adjusts the screen manually, by means of a resister, to remove the flicker. There are several problems with such an approach.

First, the detection of screen flicker is at least partially a subjective determination. Different individuals will draw different conclusions as to whether a particular screen has been properly adjusted. Second, the lighting properties at the site where the flicker adjustment is performed can be significantly different from the lighting environment at the location where the screen will be used. Third, the person adjusting the screen may make errors due to fatigue or inattentiveness. Further complicating the matter is the fact that each screen requires individualized adjustment. For example, even screens that are the same model and size and that are from the same manufacturing facility will require different flicker adjustments.

Consequently, an improved flicker detection and correction system is needed that can accurately detect and correct flicker. Further, a system is needed that can eliminate one or more of the problems described above.

SUMMARY OF THE INVENTION

The present invention provides an improvement in display screen flicker detection and correction. The system achieves its objective by using a flicker detection component. A test pattern is placed on the display screen and the flicker detection component is placed on or near the display screen. The flicker detection component senses the change in light level that results from the flickering screen. Based on the collected information, the common voltage (VCOM is adjusted on the display board such that the screen flicker is minimized.

Other embodiments, aspects, advantages and novel features of the present invention will become apparent from the following detailed description of the invention when considered in conjunction with the accompanying drawings and claims.

BRIEF DESCRIPTION OF THE DRAWINGS

The invention may be more fully understood by reading the following detailed description of the embodiments of the invention, in conjunction with the appended drawings, wherein.

DETAILED DESCRIPTION OF THE INVENTION

Figure 1:
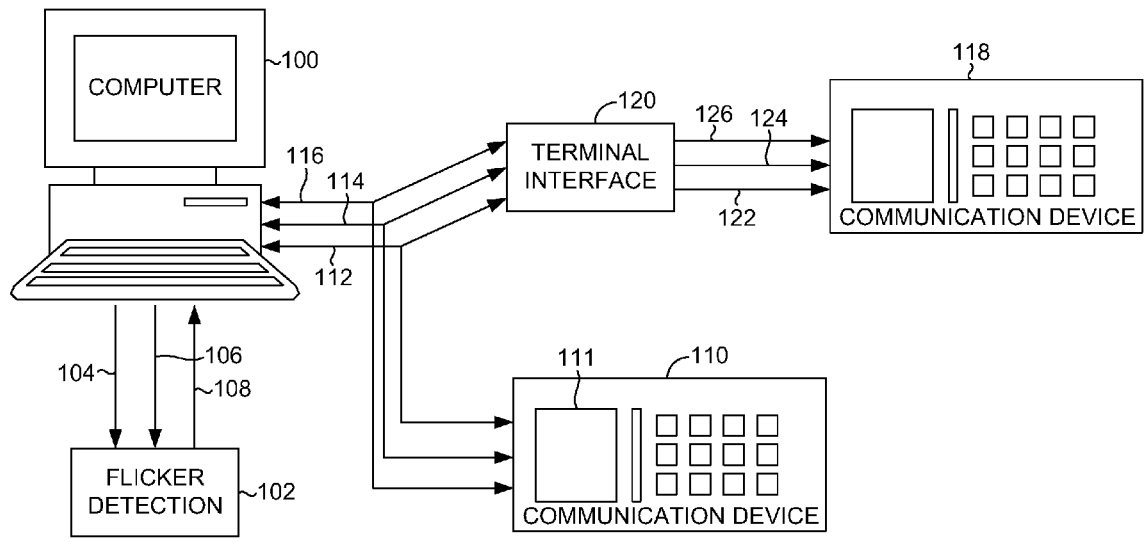
FIG. 1 depicts the various components of the flicker detection and correction system.

FIG. 1 depicts the components of a flicker detection and correction system that can be used in conjunction with the present inventions. The system includes a control component 100 such as a computer, personal computer, dedicated computerized testing component, or other suitable component capable of receiving and outputting the signals described herein and also capable of performing the processing described herein. The system also includes a flicker detection component 102 that is coupled to the control component 100 via one or more lines 104, 106, 108.

A unit 110 having a display screen 111 is also depicted. Unit 110 can be any of a wide variety of portable or non-portable devices (such as telephones, data collection or communication devices, personal digital assistants, electronic game devices, etc., etc.) The display screen 111 can be of any size or type. For example, the screen 111 can be an LCD-type color display that is used with many computerized devices such as those named above and in the background section. The unit 100 is communicatively coupled 112, 114, 116 to the control component 100. The three lines 112, 114, 116 are described further in relation to FIG. 7.

The unit 100 can be specially designed to have connectors, either external or internal, for coupling the unit 100 with the control component. The system of the present inventions, however, can also be used with devices that have not been specially adapted. FIG. 1 includes an option for connecting a unit 118 without dedicated connectors to the system. The unit 118 can be coupled directly to control component 100 or it can be coupled 122, 124, 126 thereto via a terminal interface component 120. The terminal interface component 120 is customized to pass the proper signals to the unit 118 in the proper format.

The system can also include a custom testing fixture when other testing is also going to be performed on a unit such as 110 or 112. The optional custom testing fixture is not shown in FIG. 1, but it would be located between the control component 100 and the unit 110 or 118, or between the control component 100 and the terminal interface component 120 (when present). In such a case, the custom testing fixture will also pass the flicker correction signals 112, 114, 116 to the unit 110, 118. When the unit 118 has not been specially adapted for flicker testing, it can be coupled to the system in the manner described in relation to FIG. 4 below.

Figure 2:
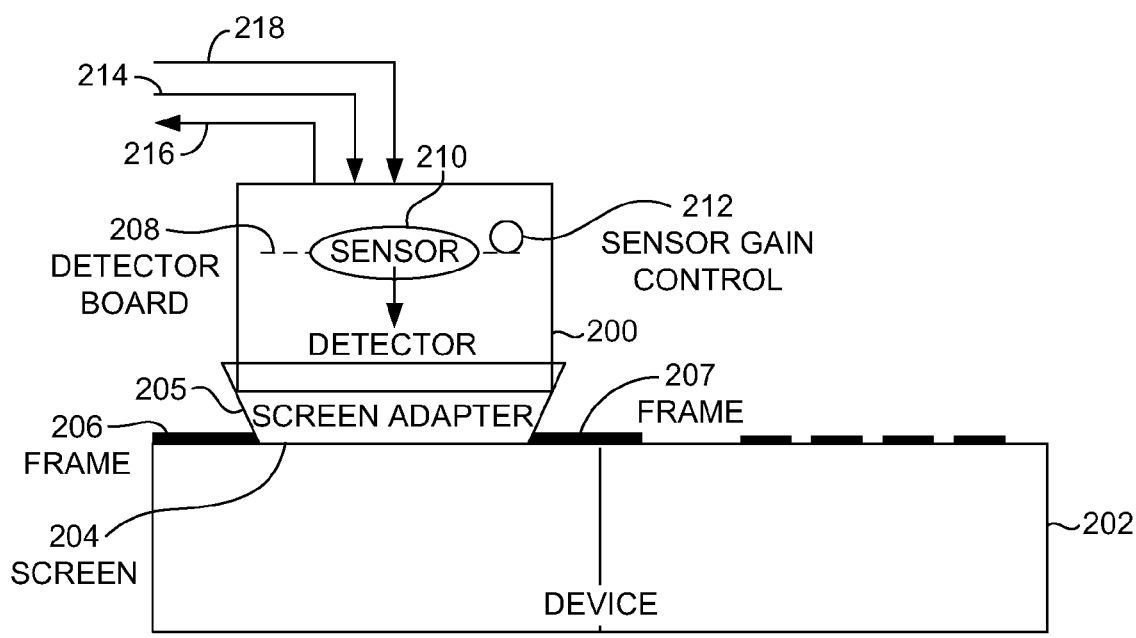
FIG. 2 depicts a flicker detection component being used to detect flicker on a device having a display screen.

FIG. 2 depicts a flicker detection component 200 being used to detect flicker on a device 202 having a display screen 204. The flicker detection component 200 has a screen adapter 205, which can be removable or non-removable, to enhance performance of the detector 200. The screen adapter 205 can serve multiple functions. For example, it can help align the flicker detection component 200 with the screen 204.

If desired, the adapter 205 can be shaped to contact a frame surrounding the screen 204 and not contact the screen 204 itself. This embodiment of the adapter 205 is especially useful when the screen 204 is a touch screen. When the screen 204 is a touch screen, contact of the flicker detection component 200 with the touch screen can disrupt the detection procedure.

Further, the adapter 205 can be used to shield the screen 204 under test from ambient light. This can improve detector efficiency and accuracy. An adapter 205 can also be used to align the flicker detection component 200 with the screen 204 even when, as is often the case, the screen 204 is partially or completely surrounded by a raised frame 206, 207 (for example, a frame providing shock protection to screen 204 or unit 202).

The flicker detection component 200 can also include a detector board 208 to hold the hardware and circuits necessary for operation of the component 200. The detector board 208 includes a light sensor 210. The sensor 210 is used to detect the changes in light energy generated over time from a flickering screen. If desired, the board can also include a sensor gain control component 212. The sensor gain control component 212 can be a digital potentiometer for example. If desired, a hand-adjustable mechanical potentiometer can be used instead of a digital potentiometer.

In one embodiment, one or more light sources (not shown in the FIG. 2 embodiment, but shown in the embodiment of FIG. 3) can be included in the flicker detection component 200. If desired, the light source can be attached to the detector board 208. The light source can be one or more light-emitting diodes (LEDs), for example, or some other suitable light source.

The flicker detection component 200 is communicatively coupled with the control component (see FIG. 1 for example) via one or more lines 214, 216, 218. A first line 214 ($V_{in}$) can be used to activate the flicker detection component 200 and supply it with operating power. Operating power may be received from the control component (see 100, FIG. 1) or it can be received from another source. A second line 216 ($V_{out}$) can be used to send the control component 100, FIG. 1, a signal representing the amount of light detected by the light sensor 210. When the flicker detection component 200 includes a light source, a third line 218 can be added to turn the light source on and off as appropriate at the beginning and ending of testing.

In one embodiment, the flicker detection component 200 is designed to output a DC signal on the $V_{out}$ 216. Such a signal is then measured with a multimeter. Alternatively, the flicker detection component 200 can convert the signal received from the sensor 210 to an AC signal. The conversion to AC can be performed on the detector board for example.

In the AC embodiment, the $V_{out}$ signal 216 is measured with an appropriate component, a Data Acquisition (DAQ) card for example. The DAQ card can be coupled with the control component 100. It has been found that the AC embodiment generally provides better resolution than the DC embodiment.

Figure 3:
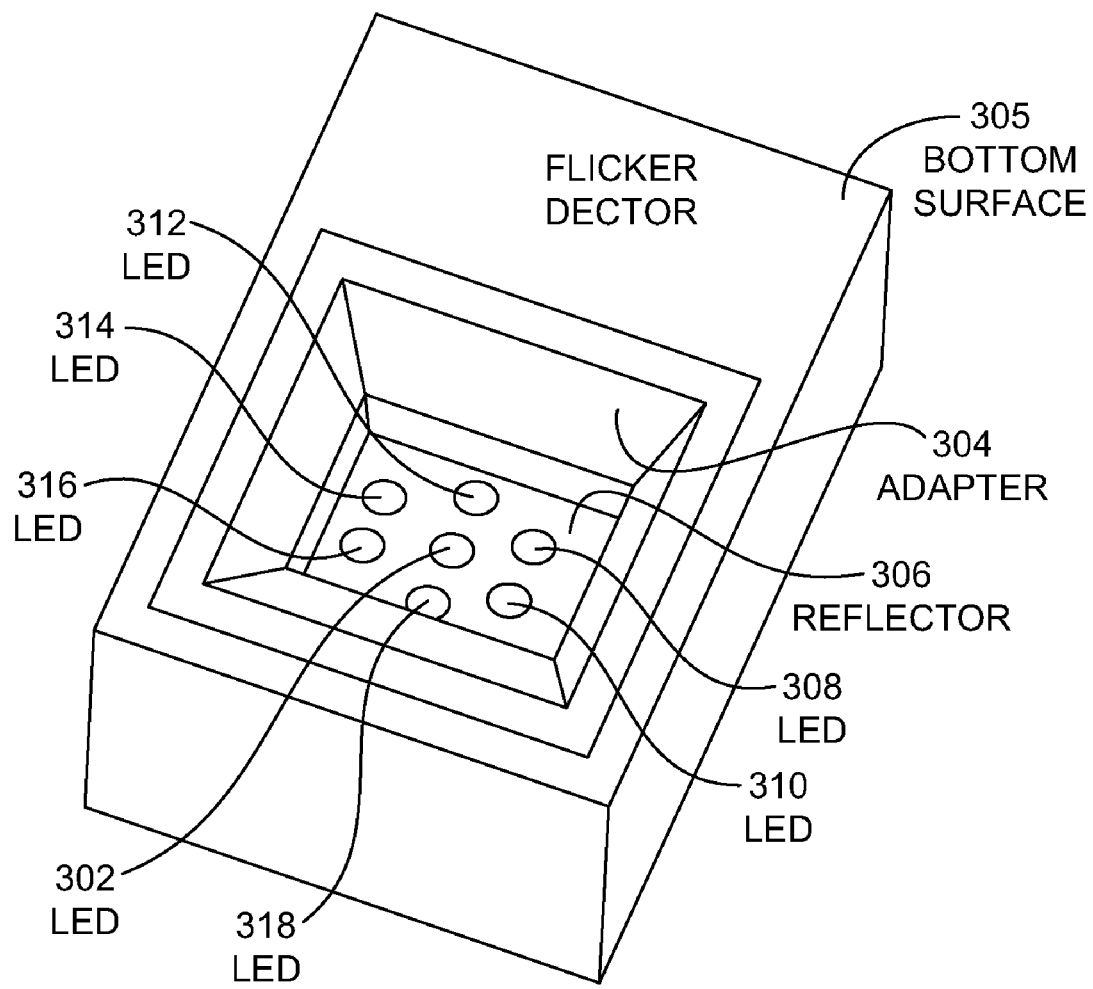
FIG. 3 depicts a bottom, exterior view of an embodiment of a flicker detection component.

FIG. 3 depicts an alternative embodiment of the internal components of a flicker detection component 300. The flicker detection component 300 includes a photosensor 302 and an adapter 304. The adapter 304 can be shaped and sized and made of a material suitable for accomplishing the purposes described above in relation to the adapter 205 of FIG. 2. The adapter 304 can be a customized piece that is attached to, and therefore protrudes somewhat from, the bottom surface 305 of the flicker detection component 300.

The embodiment of FIG. 3, unlike the flicker detection component 200 of FIG. 2, contains a light source component. The light source component of this embodiment includes a reflector 306 (an aluminum plate reflector for example) and six white LEDs 308, 310, 312, 314, 316, 318. The six LEDs 308, 310, 312, 314, 316, 318 are spaced around the photosensor 302.

FIG. 3 represents just one embodiment of a light source, however. For example, non-LED light sources can be used, greater or fewer numbers of light sources can be used, the light sources can be placed in different locations relative to the photosensor 302, or a different color of light source can be used. Further, in some applications, the reflector 306 can be omitted.

Light sources can be included, for example, when the flicker detection component 200 may be used to detect flicker on non-backlit screens. When detecting flicker on a backlit or a front lit screen, it can be possible to use the screen back light or front light as the light source. Thus, if only backlit or front lit screens are being tested and corrected, it may be possible to omit the light source(s) from the flicker detection component. Alternatively, a flicker detection component having light source(s) can be used, but with the light sources turned off. For example, newer-style reduced-glare display screens, such as transreflective display screens, can be tested using the screen's own front light.

Figure 4:
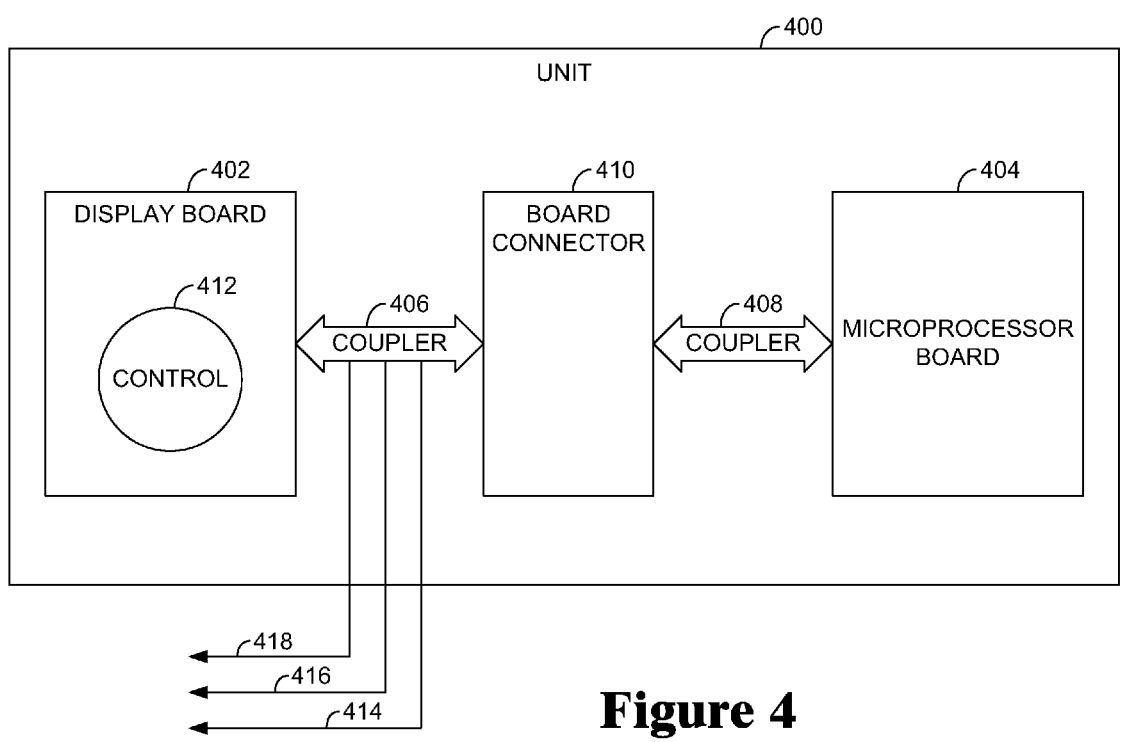
FIG. 4 depicts a device not originally designed for use with a flicker detection component, but which can never-the-less be tested by such a device.

FIG. 4 depicts some of the basic interior components of a unit 400 not originally designed to be tested by a flicker detection component, but which can never-the-less be tested by such a device. The unit 400 does not have dedicated or easily accessible connectors for coupling to a flicker detection and correction system. The unit 400 includes a display board 402 and a microprocessor board 404 that are coupled 406, 408 via a board connector 410. The display board 402 is coupled with a screen, such as an LCD (not shown). The display board 402 also includes a VCOM adjustment control 412. The VCOM adjustment control 412 can be a digital potentiometer for example. The VCOM adjustment control 412 is described in additional detail below in connection with FIG. 7.

The unit 400 can be coupled with the flicker detection and correction system via three lines 414, 416, 418. The three lines 414, 416, 418 correspond to the three lines 112, 114, 116 depicted in FIG. 1. Thus, the communicative coupling between the unit 400 and the flicker detection and correction system can be made by tapping into the appropriate lines 406 coupled with the display board 402.

Figure 5:
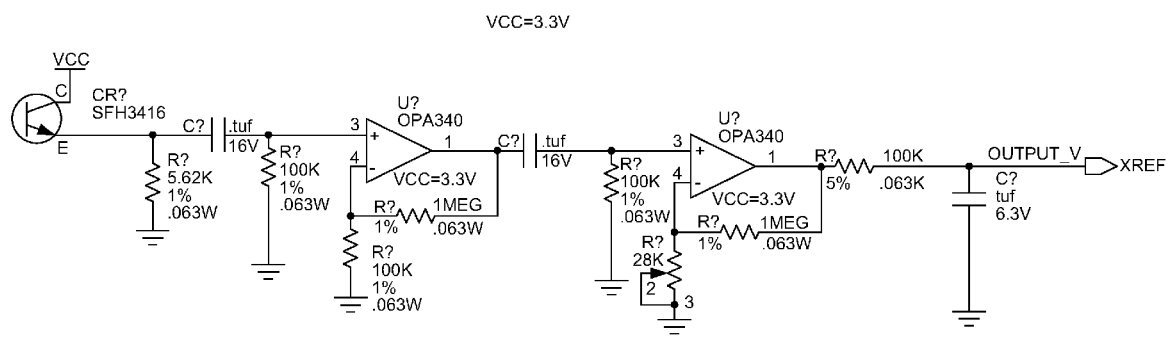
FIG. 5 depicts a schematic drawing of a flicker adjustment pick-up circuit for a flicker detection component.

FIG. 5 depicts a schematic drawing of a flicker adjustment pick-up circuit for a flicker detection component. Such a system can be used with the flicker detection component disclosed herein. It will be appreciated that other such hardware (or software) configurations can alternatively be used with the present inventions.

Figure 6:
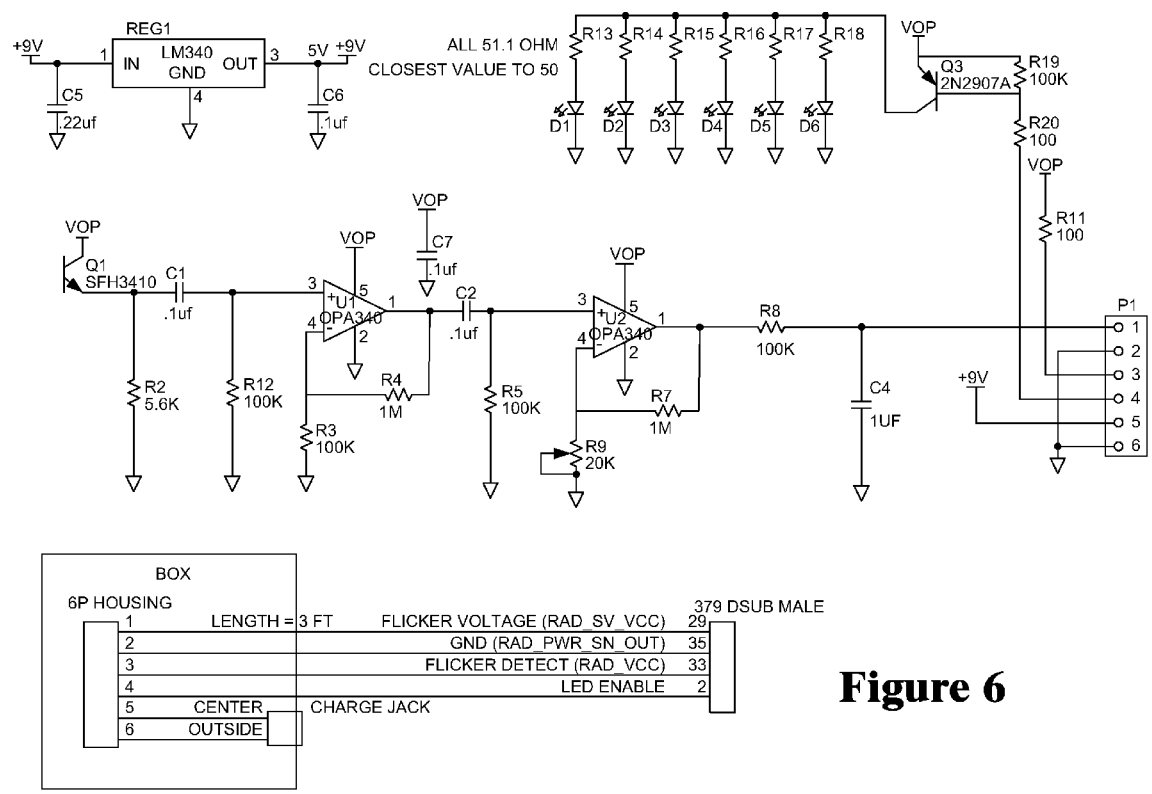
FIG. 6 depicts a schematic drawing for a flicker detection component.

FIG. 6 depicts a schematic drawing for a flicker detection component. Such a system can be used with the flicker detection component disclosed herein. It will be appreciated that other such hardware (or software) configurations can alternatively be used with the present inventions. The flicker adjustment pick-up circuit of FIG. 5 is used in the schematic presented in FIG. 6.

Figure 7:
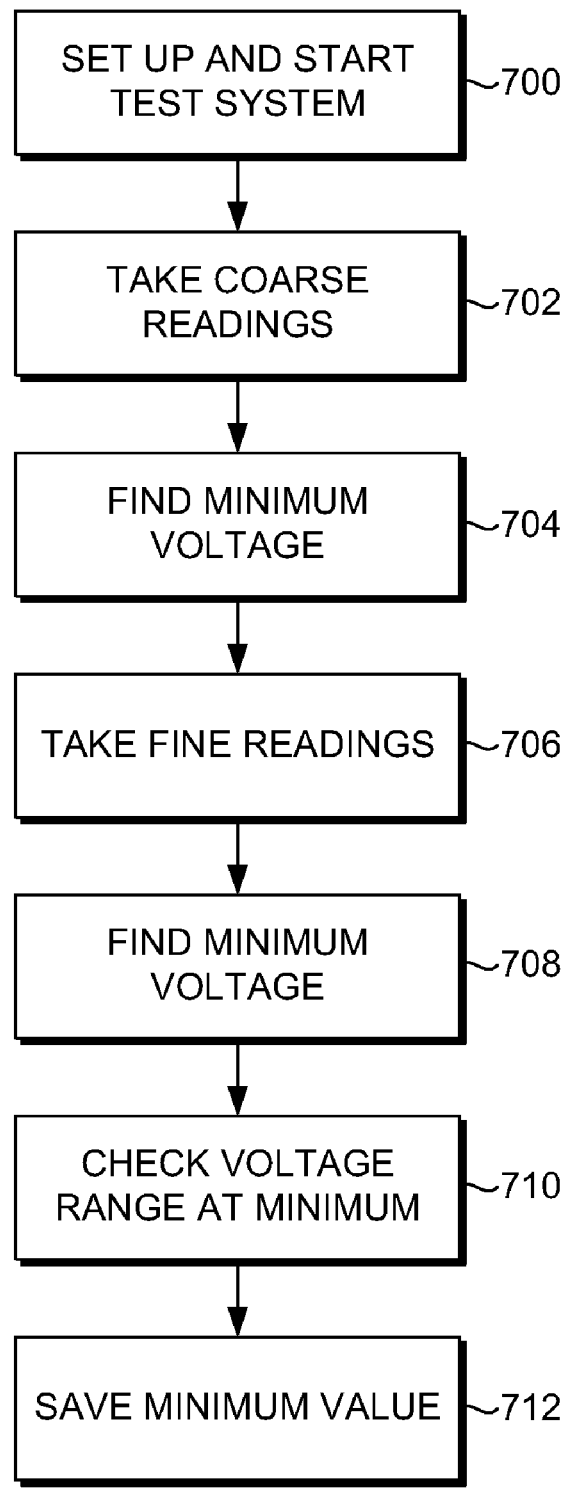
FIG. 7 depicts a flowchart of steps that can be carried out to detect and correct flicker with a flicker detection and correction system.

FIG. 7 depicts a flowchart of steps that can be carried out to detect and correct flicker with a flicker detection and correction system. First, the system is set up and the components are powered up 700. The components are connected in one of the manners described in relation to FIGS. 1, 2 and 4 above. The controlling software is started. The controlling software can be stored in control component 100 or in a device coupled therewith. The controlling software includes the appropriate drivers, for example the driver for a DAQ card (if one is used). Further, the controlling software includes an appropriate GUI interface and associated libraries. The LAB Windows/CVI program of National Instruments is an example of a suitable GUI interface/library program for use with the present inventions. The controlling software also includes instructions for executing the other steps 702, 704, 706, 708, 710, 712 of the procedure of FIG. 7.

The set up step 700 can also include a step of checking for the presence and successful connection of the flicker detection component, the unit to be tested, and the terminal interface board (if used). Further, the flicker detection component light source (if present) is turned on. If the unit under test includes a backlit screen, the backlight is turned on and the flicker detection component light source (if present) is turned off.

Figure 8:
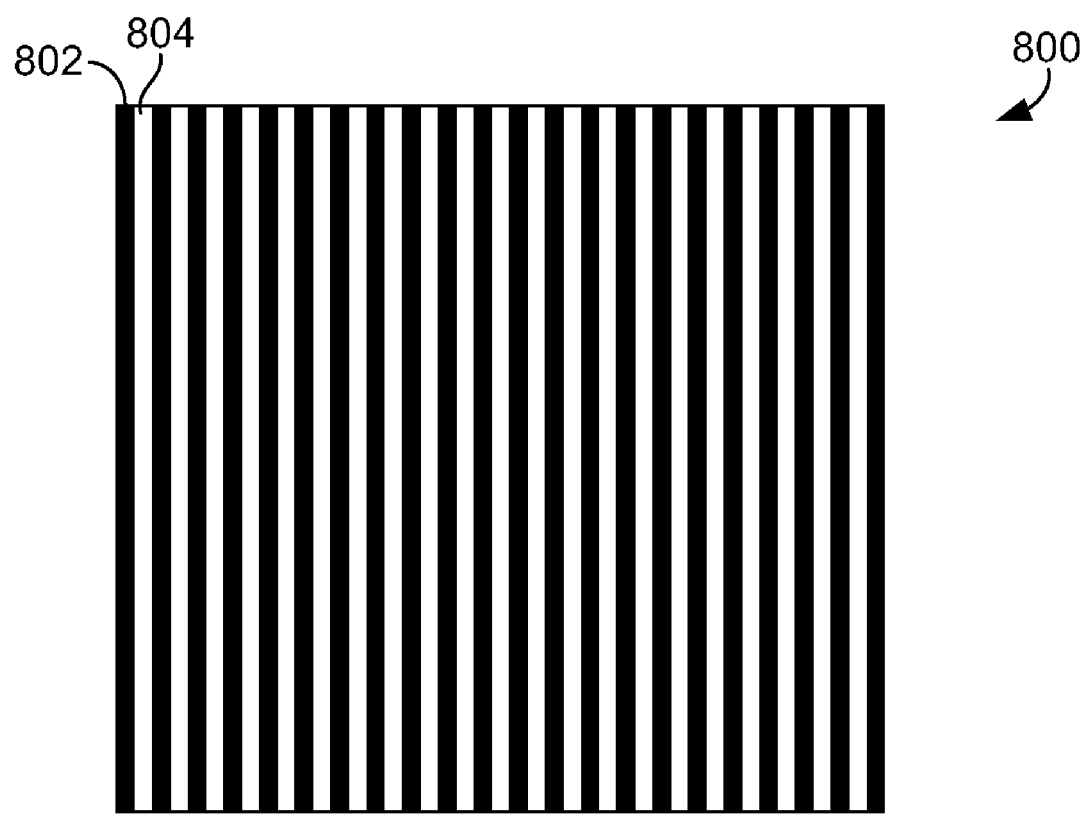
FIG. 8 depicts a screen test pattern suitable for use with the present inventions.

In addition, a test pattern must be placed on the screen prior to testing. As depicted in FIG. 8, the test pattern 800 can consist of alternating parallel black 802 and gray 804 lines, one pixel wide, which are drawn on the screen and are continually refreshed during the detection procedure. Different colors can be used for the test pattern lines 802, 804, but black and gray have proven to give the best results thus far. Further, the test pattern lines 802, 804 should be drawn in the proper order to make the flicker apparent via the test pattern 800.

The test lines 802, 804 should be drawn in the same order that the screen is refreshed. Thus, if a vertical (up to down) raster refresh is used that works its way line-by-line in a left to right manner across the screen as refresh progresses, for example refreshing along line 802 in its entirety and then along the pixels comprising line 804 in its entirety and so forth, the test pattern lines 802, 804 should be oriented to extend up and down the screen and should alternate color as you look from left to right across the screen (as shown in FIG. 8).

The set up and start procedure 700 should also set the starting value of the VCOM adjustment control. The VCOM adjustment control can be a digital potentiometer, for example, having a known number of levels. For example, a digital potentiometer having one hundred equal steps or levels can be used. (VCOM adjustment controls having a different number of levels can alternatively be used.) When a VCOM adjustment control having one hundred steps or levels is used, for example, the starting value can be level 0, level 100, level 50 or some other suitable value.

One way to reach a starting value when it is not known where, for example, a digital potentiometer VCOM adjustment control is currently set, is to simply step it a sufficient number of times to ensure that it is at the top or bottom of its range. For example, if a digital potentiometer having one hundred levels is stepped at least one hundred times in one direction or the other, you will be at the end of the potentiometer's range and that end point can then be used as the starting value.

After system set up and start 700 is completed, the detection readings can be taken. The readings and settings can be performed in several different ways. For example, FIG. 7 depicts a two-step process. First, a coarse reading is performed 702 and the general location of the minimum is found 704. Next, a fine reading is performed 706 in the neighborhood of the prior-located minimum.

To take the coarse reading 702, the signal output from the flicker detection component is read with the VCOM adjustment control level set at its starting value. Next, the starting value is incremented (or reduced) by a pre-determined amount. For example, the VCOM adjustment control can be incremented by three levels (or by five, ten or some other appropriate amount of levels). The signal output from the flicker detection component is read with the VCOM adjustment control level set at the new level. The VCOM adjustment control is then incremented again and another signal from the flicker detection component is read. The procedure continues until the entire range of the VCOM adjustment control levels (or a sufficient portion thereof) has been covered.

After the coarse reading 702 has been taken, the data from the flicker detection component is analyzed. The data can be analyzed by software or by a human operator. The minimum value is located. The minimum value shows the general location of the VCOM adjustment control level that is associated with the least amount of screen flicker.

After the VCOM adjustment control level associated with the coarse minimum value is determined 704, a fine reading is taken 706. The fine reading 706 is taken only in the neighborhood of the VCOM adjustment control level associated with the coarse minimum value. For example, the VCOM adjustment control level can be set a certain amount higher or lower (ten levels higher or lower for example) than the VCOM adjustment control level associated with the coarse minimum value. The signal from the flicker detection component is read. Next, the VCOM adjustment control level is then incremented by a smaller amount than it was when the coarse reading was taken 702. For example, the VCOM adjustment control level can be incremented by just one (or two) levels when taking the fine readings. Further readings are taken, the VCOM adjustment control level being incremented after each reading. The fine readings continue until a predetermined level on the other side of the VCOM adjustment control level associated with the coarse minimum value is reached. For example, fine reading can take readings ten levels higher and ten levels lower than the VCOM adjustment control level associated with the coarse minimum value. It will be appreciated that testing ranges other than ten levels can also be used.

After the fine readings are taken 706, the data from the flicker detection component is again analyzed. As before, the data can be analyzed by software or by a human operator. The minimum value is located. The minimum value shows the specific location of the VCOM adjustment control level that is associated with the least amount of screen flicker. The system then sets the VCOM adjustment control at the level determined via the fine readings.

If desired, an error check can be performed before setting the VCOM adjustment control at the level determined via the fine readings. The range of total voltage swing associated with the determined level can be checked.

To check the range of total voltage swing, the difference between the maximum signal received from the flicker detection component and the determined minimum value is calculated. If the calculated range is too small, the determined minimum value is discarded and the procedure of FIG. 7 is repeated. Close maximum and minimum values are indicative of an error such as, for example, pointing the flicker detector component toward a ceiling light or window, instead of the screen, during operation. The acceptable difference between the maximum and minimum values can be chosen to meet the needs of the application at hand. After verifying that the range is not excessive, the VCOM adjustment control is set at the level determined via the fine readings. If the range is excessive, the procedure of FIG. 7 can be repeated.

Alternatively, instead of the two-step fine/coarse reading procedure described above, a one-step procedure can be performed wherein the coarse reading step 702 is omitted and only a fine reading 706 is performed across the entire range of levels or steps (or a sufficient portion of such range) of the VCOM adjustment control.

In yet another embodiment, a three-stage (or more) procedure is performed. For example, a third pass can be made after the two-step procedure described via FIG. 7 is completed. Thus, procedures can be developed wherein successively finer readings are taken and successively better minimums are located.

Referring again to FIG. 7, after determining the proper VCOM adjustment control level, the value can be saved 712, if desired, for later use. The level value can be stored in the unit being tested. The level value can then be used to resynchronize the flicker setting in the unit at some later date if necessary. Further, if desired, the level value for the particular display can be stored outside the unit being tested, in a log file, for possible statistical or other use.

Figure 9:
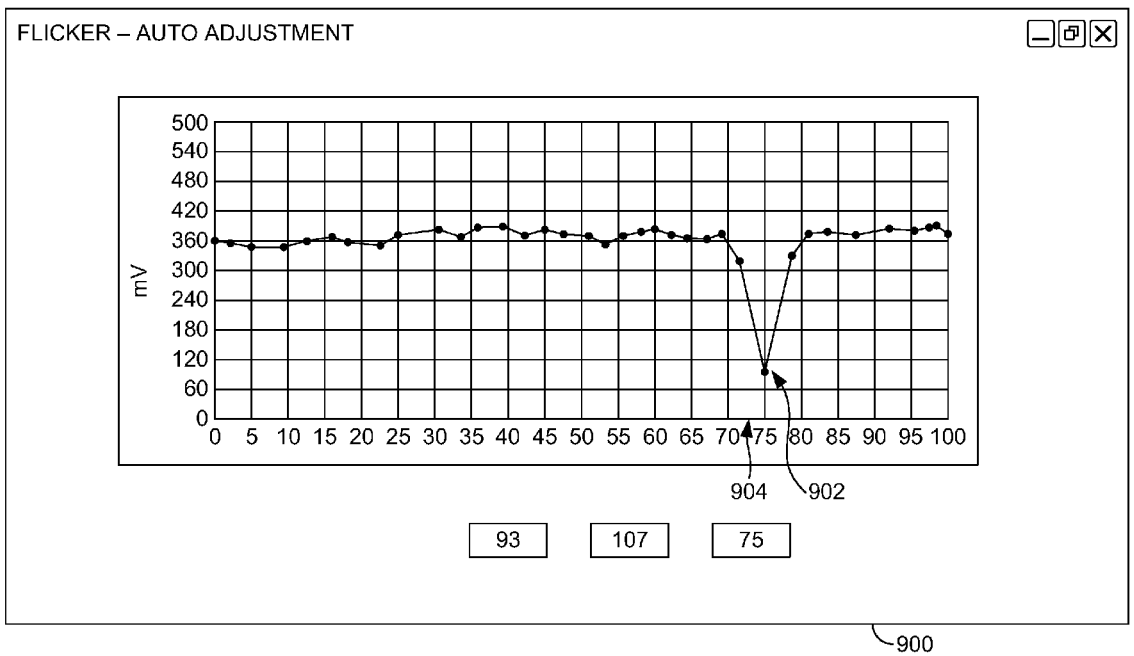
FIG. 9 depicts a sample output graph charting the output received from a flicker detection component.

FIG. 9 depicts an output graph 900 charting the output received from a flicker detection component. This particular output is from a unit using the AC embodiment described above. As a result, the resolution at the minimum level 902 is enhanced (note the sharp downward transition in flicker detection component signals between the 70$^{th}$ and 75$^{th}$ levels 904). On the particular screen being set in FIG. 9, the minimum amount of flicker was detected when the VCOM adjustment control was at level or step 75 (902, FIG. 9).

The range of total voltage swing discussed above in relation to FIG. 7 can be observed in the output depicted in FIG. 9. The minimum signal appears at the 75$^{th}$ level 902 and the maximum signal was received when the VCOM adjustment component was set at approximately the 35$^{th}$ level. Thus, the range of total voltage swing in this data is approximately 283 mV (390 mV at level 35 minus the 107 mV at the minimum at level 75). Since this was considered to be a satisfactory voltage swing, the minimum value was accepted and the VCOM adjustment component was set at 75 to minimize screen flicker.

The scope of the present inventions is intended to cover all variations, omissions, substitutions and combinations which are and which may become apparent from the disclosed embodiments. The scope of the invention should be extended to the claimed invention and all of its equivalents.

The invention claimed is:

1. A flicker detection and correction system for detecting and correcting flicker in display screens, comprising:
    a flicker detection component, comprising;
    a light sensor outputting a direct current (DC) signal in response to sensed light;
    a DC to analog current (AC) converter, coupled with said light sensor, to convert the DC signal generated by the light sensor to an AC signal;
    a signal output, coupled with said DC to AC converter, to communicate an AC signal; and
    a screen adapter, coupled with a sensing end of said flicker detection component, to adapt the flicker detection component to physical attributes of a particular device having a screen to be tested.

2. The flicker detection and correction system of claim 1, further comprising a control component, coupled with said flicker detection component so as to receive an AC signal output via said signal output.

3. The flicker detection and correction system of claim 2, further comprising:
    a device to be tested, coupled with said control component, comprising;
    a display screen;
    a common voltage (VCOM) adjustment control; and
    a connector for coupling said VCOM adjustment control with said control component.

4. The flicker detection and correction system of claim 3, wherein said device to be tested further comprises a light source located to illuminate said display screen, and wherein said control component uses said light source to illuminate said display screen during flicker detection.

5. The flicker detection and correction system of claim 4, wherein said light source comprises a display screen back light.

6. The flicker detection and correction system of claim 4, wherein said light source comprises a display screen front light.

7. The flicker detection and correction system of claim 1, wherein said flicker detection component further comprises a light source located to illuminate a display screen during flicker detection.

8. The flicker detection and correction system of claim 7, wherein said light source comprises a plurality of light emitting diodes.

9. The flicker detection and correction system of claim 1, wherein said flicker detection component further comprises a detector board, wherein said detector board is communicatively coupled with said light sensor, and wherein said DC to AC converter is located on said detector board.

10. A flicker detection and correction system for detecting and correcting flicker in display screens, comprising:
    a flicker detection component, comprising;
    a detector board;
    a light sensor, to output a direct current (DC) signal in response to sensed light, coupled with said detector board;
    a DC to alternating current (AC) converter, located on said detector board, to convert a DC signal generated by the light sensor to an AC signal; and
    an output to communicate the AC signal;
    a screen adapter, coupled with a sensing end of said flicker detection component, to adapt the flicker detection component to physical attributes of a device having the screen being tested;

a control component, coupled with said output to receive an AC signal, said control component controlling a flicker detection and correction process; and
a device to be tested, comprising;
a display screen;
a common voltage (VCOM) adjustment control; and
a connector, coupling said VCOM adjustment control with said control component.

* * * * *